(No Model.)

A. W. DAVIS.
BREAD OR CAKE WARMER.

No. 499,285. Patented June 13, 1893.

Witnesses
H. Alber.
R. A. McElroy

Inventor
Arthur W. Davis
By his Attorney P. Byrne

UNITED STATES PATENT OFFICE.

ARTHUR WILLIAM DAVIS, OF BIRMINGHAM, ALABAMA.

BREAD OR CAKE WARMER.

SPECIFICATION forming part of Letters Patent No. 499,285, dated June 13, 1893.

Application filed March 23, 1893. Serial No. 467,510. (No model.)

*To all whom it may concern:*

Be it known that I, ARTHUR WILLIAM DAVIS, a citizen of the United States, residing at Birmingham, in the county of Jefferson and State of Alabama, have invented certain new and useful Improvements in Bread or Cake Warmers; and I do hereby declare the following to be a full, clear, and exact description of the invention, such as will enable others skilled in the art to which it appertains to make and use the same.

My invention relates to improvements in that class of devices, known as bread, roll, or biscuit warmers, a device used to keep bread of the various kinds warm for some time after baking; and the objects of my improvement are, first, to construct a device of that kind, that will be simple and cheap to make, a device that can be heated, or kept warm, on any of the usual steam cookers now in use, or any other simple device containing hot water, with apertures in the upper side to allow the steam to ascend to the bread warmer; second, to provide a device of that kind, that will not bake, or dry the bread, rolls, or biscuit placed within it, and that the bread first placed in the warmer, will be the first to reach the outlet door, to be taken out. The device can also be divided into two or more separate compartments as may be desired, to keep the various kinds of bread, rolls, or biscuits separate. I attain these objects by the combination and arrangement of the device illustrated in the accompanying drawings, in which—

Figure 1:
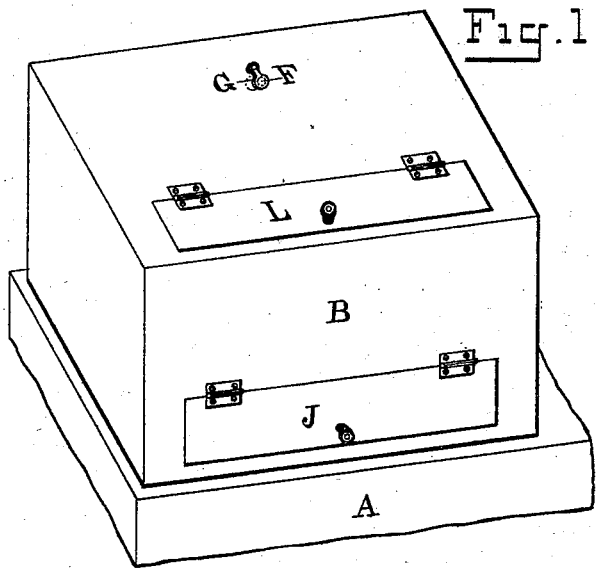
Figure 2:
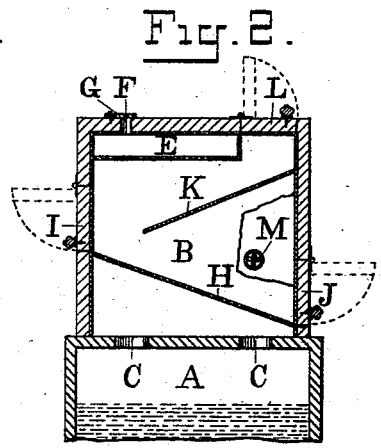
Figure 4:
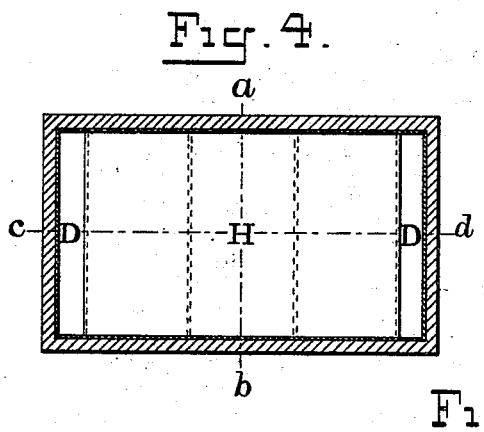
Figure 3:
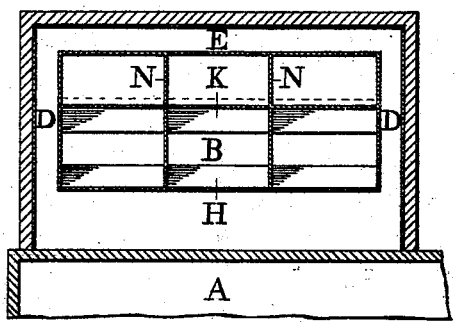
Figure 5:
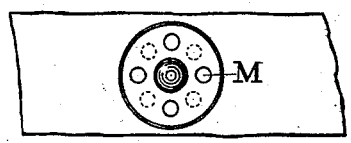

Figure 1, is a perspective view of my bread warmer. Fig. 2, is a cross vertical sectional view, through the line $a, a$. Fig. 3, is a vertical sectional view, through the line $c, d$. Fig. 4, is a bottom view, at the intersection of the warmer, with the steam heater. Fig. 5, is an enlarged view, of one of the valves, for admission of steam to the inside of the warmer.

Similar letters refer to similar parts throughout the several views.

The steam, or water heater A, can be the usual steam cooker in general use, or it can be made of any suitable metallic substance, with sufficient area for the bread warmer B to cover the top of it, and it can be heated with a small furnace, an oil burner, or any other suitable device placed underneath. The water heater A, is provided on its upper side with two or more apertures C, C', to admit steam to enter freely from the heater to the under side of the bread warmer.

The bread warmer B, can be made of any suitable material. It can be made of wood with metallic lining, or made of any suitable metallic substance as may be desired. It is left open on the bottom, to allow steam from the heater to freely enter, and is provided with steam passages D, D' on both ends, the said steam passages extending upward on both ends, and entering a steam chamber extending over the top. In the center of the steam chamber, is provided a steam outlet F, covered with a pivoted cap G to close, or to open the outlet as may be desired.

On the inside of the bread warmer, is provided a metallic bottom H, set on an angle, the said bottom extending over the whole inside space, except the steam passages D, D' which are open on the under side. At the highest side of the bottom, is placed an admission door I with hinges on the outside. At the lower edge of the bottom, is placed an outlet door with hinges placed in a like manner. The bread when placed in a warmer by the inlet-door, will be pushed down the inclined bottom. As fresh bread is inserted toward the outlet door the bread first placed in the warmer, being nearest the outlet door, will always be removed first.

Above the bottom H on the inside of the warmer, is placed a metallic shelf K, made less than the full width of the warmer. The said shelf is placed on an angle in the opposite direction to the bottom, and on top of the warmer a door L is provided, for admission to the shelf. The bread upon the shelf is pushed down the incline, as additional bread is inserted until it falls from the shelf to the bottom, and by that means reaches the outlet door. On the upper shelf is placed the bread, or rolls that are nearly cold, and as they remain longer in the heater by passing over a greater distance to reach the outlet door, will become warm before they are taken out of the warmer.

To prevent the baking, or drying of the bread when in the warmer, the ends are provided with steam admission openings, leading from the steam passages D, D' to the inside of the warmer. The said openings are covered with valves M pivoted in the center and having like openings in the inside shelf to regulate the admission of steam, the turning of the valve M, or closing the steam apertures as may be desired; the inside of the bread warmer may be divided into a series of compartments, by metallic vertical partitions N, N' as shown if so desired, to keep the bread, rolls, and biscuit in separate compartments.

Having thus described my invention, what I claim as new, and desire to secure by Letters Patent, is—

A bread and cake warmer, consisting of a metallic, or a metallic lined receptacle, placed on a steam, or hot water heater, having apertures to allow the steam, to enter the receptacle, steam passages at the ends between the inner and outer shell opening into a steam chamber extending over the top, an outlet opening for steam from the chamber covered with a cap, a metallic bottom placed in the inner shell at an angle as shown, two doors on opposite sides, to gain admission to the bottom, a shelf placed partly across the inner shell above the bottom, inclined in an opposite angle to the bottom as shown, a door on the opposite side of the receptacle to gain access to the shelf, one or more steam openings covered with a valve from the steam passages to the inside of the shell, the inside of the receptacle divided by one or more vertical partitions, all combined as shown and set forth.

In testimony whereof I affix my signature in presence of two witnesses.

ARTHUR WILLIAM DAVIS.

Witnesses:
J. W. TAYLOE,
J. E. BROOM.